Oct. 31, 1950          W. C. MORRIS          2,528,240

TRANSFORMER DIFFERENTIAL RELAY

Filed Dec. 10, 1949

Inventor:
William C. Morris,
by Ernest C. Britton
His Attorney.

Patented Oct. 31, 1950

2,528,240

UNITED STATES PATENT OFFICE 2,528,240

TRANSFORMER DIFFERENTIAL RELAY

William C. Morris, Sharon Hill, Pa., assignor to General Electric Company, a corporation of New York Application December 10, 1949, Serial No. 132,384

2 Claims. (Cl. 175—294)

My invention relates to improvements in protective arrangements for electric circuits, and, more particularly, to circuits including the windings of electric apparatus subject to transient magnetizing currents.

An object of my invention is to provide an improved protective system which will have desired sensitivity of response under steady state operating conditions and which will not produce unnecessary circuit interruptions in response to transient magnetizing currents.

Another object of my invention is to provide a protective device which will respond to operating overload currents to trip a circuit breaking device and which will not respond to transient overload magnetizing inrush currents.

When electrical apparatus such as a power transformer is connected to a source, the inrush magnetizing current may momentarily attain a value several times normal load current. A disadvantage of conventional protective systems is that frequently they respond to these large momentary currents and effect unnecessary current interruptions.

Various expedients have been adopted to avoid this difficulty. One of them is to decrease permanently the sensitivity of the protective devices, by setting the protective devices to operate at a point above the maximum expected value of magnetizing current. Another gives the protective devices a time setting sufficiently great to avoid operation during the probable maximum period of the magnetizing current. Both of these methods are objectionable since they involve a sacrifice of protection under normal operating conditions.

During the magnetizing inrush of exciting current to an electric apparatus of the type mentioned, the second and higher harmonic frequencies of the exciting current are present when the iron of the apparatus is in a state of high permeability, but in phase faults or short circuits the second harmonic is not present.

One structure disclosed in the prior art includes a differential relay to operate a power source circuit breaker, responding to normal overload to trip the circuit breaker but refusing to respond to magnetizing inrush current overload. To accomplish this result, resonant circuits were included to tune operating motor means so that it does not respond when second harmonics are present in the circuit. Because of the large capacitors provided in the resonant circuit, the apparatus required by such an arrangement is expensive and as the size of capacitors required varies inversely with the frequency, the cost of this arrangement for use with frequencies under 60 cycles is prohibitive.

According to my invention, the primary coils of a transformer are connected to a source of supply through a circuit breaker, the trip coil of which is controlled by a protective induction type relay. The relay is provided with a rotatable shaft supporting a disk and the closing member of a switch controlling the supply of current to the trip coil. Opposing torques are applied to the disk by an operating and a restraining motor element having split pole U-shaped cores with windings connected to the primary and secondary transformer windings respectively to be energized by the sum and the difference of the currents therein.

Torque is produced by mounting copper shading disks upon one pair of corresponding split poles of the restraining element core to obtain a flow of flux from the unshaded pair of poles to the shaded pair. A shading disk is mounted upon one split pole of the operating element core while the inductance coil of a resonant circuit is mounted around one of the other pair of split poles of the core. The resonant circuit includes a capacitor connected in series with the inductance coil and is tuned to a frequency above the fundamental frequency of the operating current.

When the ratio between the sum and the difference of the primary and secondary currents of the protected apparatus is less than a predetermined value, the restraining element torque retains the switch member against a stop, the torque exerted by the operating element being negligible. When the ratio increases in the absence of currents of the tuned frequency in the windings as in a phase fault, the operating torque increases overpowering the restraining torque to trip the circuit interrupter.

An increase in the ratio due to currents of the tuned frequency indicating the presence of overload residual currents, causes the inductance coil to be energized, reducing the torque applied to the disk by the operating element.

In the accompanying drawing.

Figure 1:
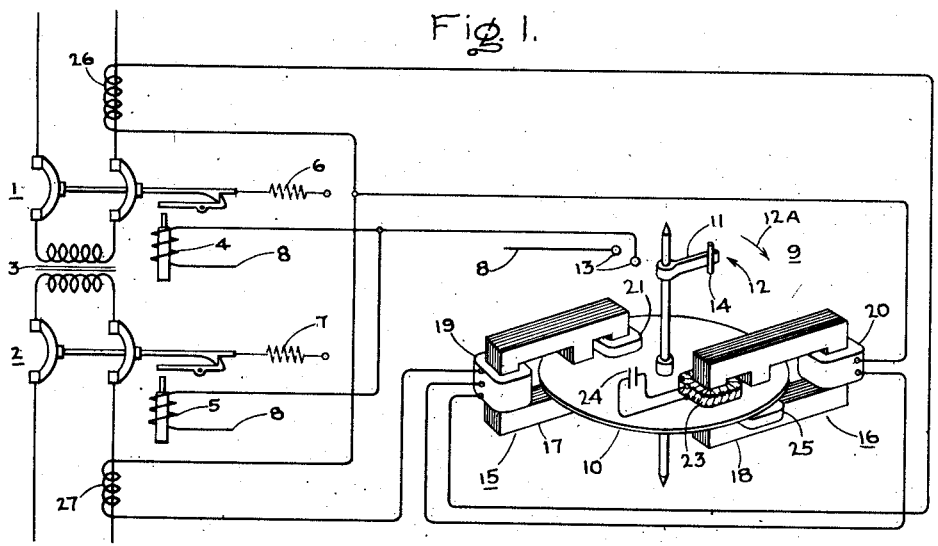
Fig. 1 illustrates one embodiment of my invention including a transformer connected to a source of power and to a secondary circuit by circuit breakers controlled by a differential relay.
Figure 2:
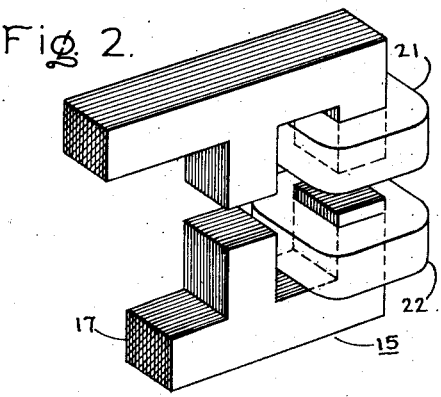
Fig. 2 illustrates the construction of the restraining motor element of the relay.
Figure 3:
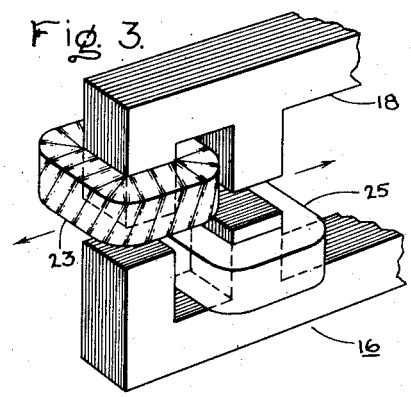
Fig. 3 illustrates the construction of the operating motor element of the relay.

Referring to the drawing, a circuit breaker 1 controls the primary circuit, and a circuit breaker 2 controls the secondary circuit of a transformer 3. The circuit breakers are provided respectively with operating springs 6 and 7 and with trip coils 4 and 5, having one terminal connected to a current source 8.

A differential relay 9 is provided with a disk 10 mounting a contactor 11 which is arranged to rotate in the direction 12 to close a pair of contacts 13 of a switch completing a circuit between the trip coils 4, 5 and source 8 to trip the circuit breakers 1 and 2, and to rotate in the restraint direction 12A to carry contactor 11 to stop 14. A pair of motor elements 15 and 16 having U-shaped field structures 17 and 18 with end and intermediate pairs of oppositely extending split poles therein and field windings 19 and 20 respectively, are mounted in inductive relation with the disk 10. The restraining motor element 15 is provided with shading rings 21 and 22, mounted upon the end pair of split poles of core 17 so that at all frequencies, element 15 produces torque in the direction 12A.

Operating motor element 16 is provided with a wound shading coil 23 mounted on one of the end pair of split poles of the core 18 and connected in series with a capacitor 24 in a resonant circuit. The circuit is tuned to a frequency above the fundamental frequency of the exciting current. In the present embodiment of my invention, the resonant circuit is tuned to a frequency near to and less than the second harmonic of the operating current. A copper shading ring 25 is mounted around one of the intermediate split poles of core 18.

Coil 19 is connected in series with a pair of current transformer coils 26 and 27 located respectively in the primary and secondary windings of transformer 3 to be energized by the sum of the currents therein. Coil 20 is connected to coil 19 and the connection between coils 26 and 27 to be energized by the difference between the currents in coils 26 and 27.

Figure 4:
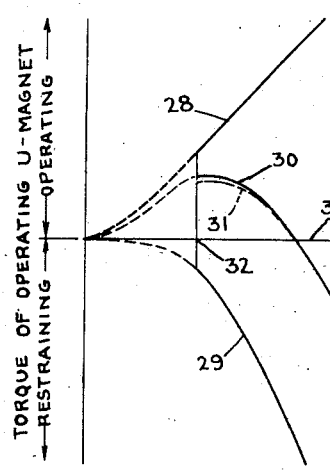
Fig. 4 is a graph of the torque output of the motor element of the relay plotted against the frequency of the currents in the transformer windings.

The full line curves of Fig. 4 were obtained from test data on a 25-cycle model of my invention. Curve 28 was obtained from the torque output of the motor element having shading ring 25 mounted on one of the intermediate pair of split poles of the U-magnet and without a shading coil on the other pair of poles. Curve 29 was obtained with shading coil 23 mounted upon one of the end pair of poles and without a shading ring. Curve 30 was plotted from the torque produced by motor element 16 with shading ring on an intermediate pole and with shading coil 23 on an end pole of element 16. The dot-dash curve 31 is the average of curves 28 and 29. The dotted portions of the curves are exterpolations of the curves 28, 29 and 30.

According to the curves the operating torque of the operating motor element caused by the shading ring increases at a substantially uniform rate from a point below the fundamental frequency 32. The restraining torque of the operating element caused by the shading coil tuned to a frequency between the first and second harmonics of the operating current increases slowly to the fundamental frequency and thereafter increases rapidly. The resultant of the two torques increases to become substantially constant in the operating direction around the fundamental frequency after which it decreases to zero near the second harmonic frequency and continues to decrease below zero as the frequency increases to exert torque increasing in the restraining direction.

The curve indicates that torque caused by the shading coil decreases the resultant torque of the operating element as the frequency increases, until the operating torque is nullified at a frequency near the second harmonic, the distinctive frequency of the residual currents, to prevent the disk from rotating to close the operating circuit of the protective device.

As a further precaution against the protective device tripping due to momentary overload residual currents, a time lag is introduced in the closing of contacts 13 by spacing stop 14 and contacts 13 at a suitable angle to allow residual currents to dissipate as contactor 11 rotates therebetween responsive to operating torque.

While the present invention has been described by reference to particular embodiments thereof, it will be understood that numerous modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. In combination with a power transformer provided with primary and secondary windings, said primary winding being connected to an alternating current supply, a circuit interrupter for controlling said alternating current supply, a device for controlling current to said interrupter comprising a switch connected between said interrupter and said supply, a differential relay provided with a member selectively rotatable in restraint or operating direction, a member of said switch being mounted upon said rotatable member, restraining and operating motor means for controlling the rotation of said rotatable member, electrical connections connecting the fields of said motor means to the windings of said transformer so that said motor means are respectively energized in accordance with the sum and the difference between the currents therein, the armatures of said motor means having field structures provided with pairs of oppositely extending split poles therein, shading disks being mounted upon one pair of split poles of said restraining means for producing a torque in said restraining direction, a shading disk mounted around one of a pair of split poles of said operating means for producing a torque in said operating direction, a coil mounted around one of the other pair of poles of said operating means for producing a torque in said restraining direction, a capacitor connected in series with said coil to form a resonant circuit, said circuit being tuned to respond to harmonic frequencies above the fundamental frequency of said supply current so that when currents having said harmonic frequencies are present in said windings said operating means exerts a restraining force upon said movable member, and when overload currents without said harmonic frequencies are present in said windings, said rotatable member rotates causing said switch means to close energizing said interrupter to open said supply circuit.

2. In combination with a power transformer provided with primary and secondary windings, said primary winding being connected to an alternating current supply, a circuit interrupter for controlling said alternating current supply, means for controlling current to said interrupter comprising a switch, a differential relay provided with a member selectively rotatable in restraint or operating direction, a member of said switch being mounted upon said rotatable member, restraining and operating motor means for controlling the rotation of said rotatable member, electrical connections connecting the fields of said motor means to the windings of said transformer so that said restraining and operating motor means are respectively energized in accordance with the sum and the difference between the currents therein, the armature of said operating means being provided therein with pairs of oppositely extending split magnetic poles, a shading disk mounted around a pole of one of said pairs for producing a torque in said operating direction, a coil mounted around a pole of the other of said pairs for producing a torque in said restraining direction, a capacitor connected in series with said coil to form a resonant circuit, said circuit being tuned to respond to harmonic frequencies above the fundamental frequency of said supply current so that when currents having said harmonic frequencies are present in said windings said operative means exerts a restraining force upon said movable member, and when overload currents without said harmonic frequencies are present in said windings, said rotatable member rotates causing said switch means to close energizing said interrupter to open said supply circuit.

WILLIAM C. MORRIS.

REFERENCES CITED

The following references are of record in the file of this patent:

UNITED STATES PATENTS

| Number | Name | Date |
| --- | --- | --- |
| 1,787,277 | Kennedy | Dec. 30, 1930 |
| 2,290,101 | Gutmann | July 14, 1942 |